United States Patent [19]
Everett et al.

[11] Patent Number: 5,477,025
[45] Date of Patent: Dec. 19, 1995

[54] LASER NOZZLE

[75] Inventors: Mark A. Everett, Mesa, Ariz.; Richard F. Haraz, Cumming, Ga.

[73] Assignee: Quantum Laser Corporation, Norcross, Ga.

[21] Appl. No.: 181,535

[22] Filed: Jan. 14, 1994

[51] Int. Cl.$^6$ .................................................. B23K 26/14
[52] U.S. Cl. ............................ 219/121.84; 219/121.63; 219/121.65; 451/102
[58] Field of Search .................... 219/121.6, 121.65, 219/121.84, 121.63, 121.85, 121.86, 121.66; 451/102; 239/343; 427/597, 422; 51/439

[56] References Cited

U.S. PATENT DOCUMENTS

| | | | |
|---|---|---|---|
| 3,053,968 | 9/1962 | Gorman et al. | 219/74 |
| 3,251,550 | 5/1966 | Lippert et al. | 239/4 |
| 4,218,855 | 8/1980 | Wemmer | 51/439 |
| 4,324,972 | 4/1982 | Furrer et al. | 219/121.84 |
| 4,396,529 | 8/1983 | Price et al. | 252/307 |
| 4,478,368 | 10/1984 | Yie | 239/430 |
| 4,724,299 | 2/1988 | Hammeke | 219/121.67 |
| 4,730,093 | 3/1988 | Mehta et al. | 219/121.63 |
| 4,743,733 | 5/1988 | Mehta et al. | 219/121.66 |
| 4,803,335 | 2/1989 | Steen et al. | 219/121.84 |
| 4,804,815 | 2/1989 | Everett | 219/121.6 |
| 4,835,357 | 5/1989 | Schalk | 219/121.64 |
| 4,947,463 | 8/1990 | Matsuda et al. | 219/121.85 |
| 5,005,769 | 4/1991 | Sauvinet et al. | 239/429 |
| 5,018,317 | 5/1991 | Kiyoshige et al. | 51/410 |
| 5,043,548 | 8/1991 | Whitney et al. | 219/121.47 |
| 5,199,229 | 4/1993 | Herdd et al. | 51/439 |
| 5,321,228 | 6/1994 | Krause et al. | 219/121.84 |

OTHER PUBLICATIONS

Ceramic Nozzles, Inc. (brochure).
Profax (brochure).
*Welding Handbook*, Eighth Edition, vol. 2, ed. R. L. O'Brien (1991).

*Primary Examiner*—Tu Hoang
*Attorney, Agent, or Firm*—Joseph W. Berenato, III

[57] ABSTRACT

A nozzle for delivering particulate matter into a molten pool created on a substrate includes a core through which the particulate is delivered, an annulus surrounding the core for simultaneously delivering a shield gas toward the molten pool and shield gas conditioning apparatus. The conditioning apparatus includes a system of wire mesh screens and a cup for directing the gas flow.

34 Claims, 2 Drawing Sheets

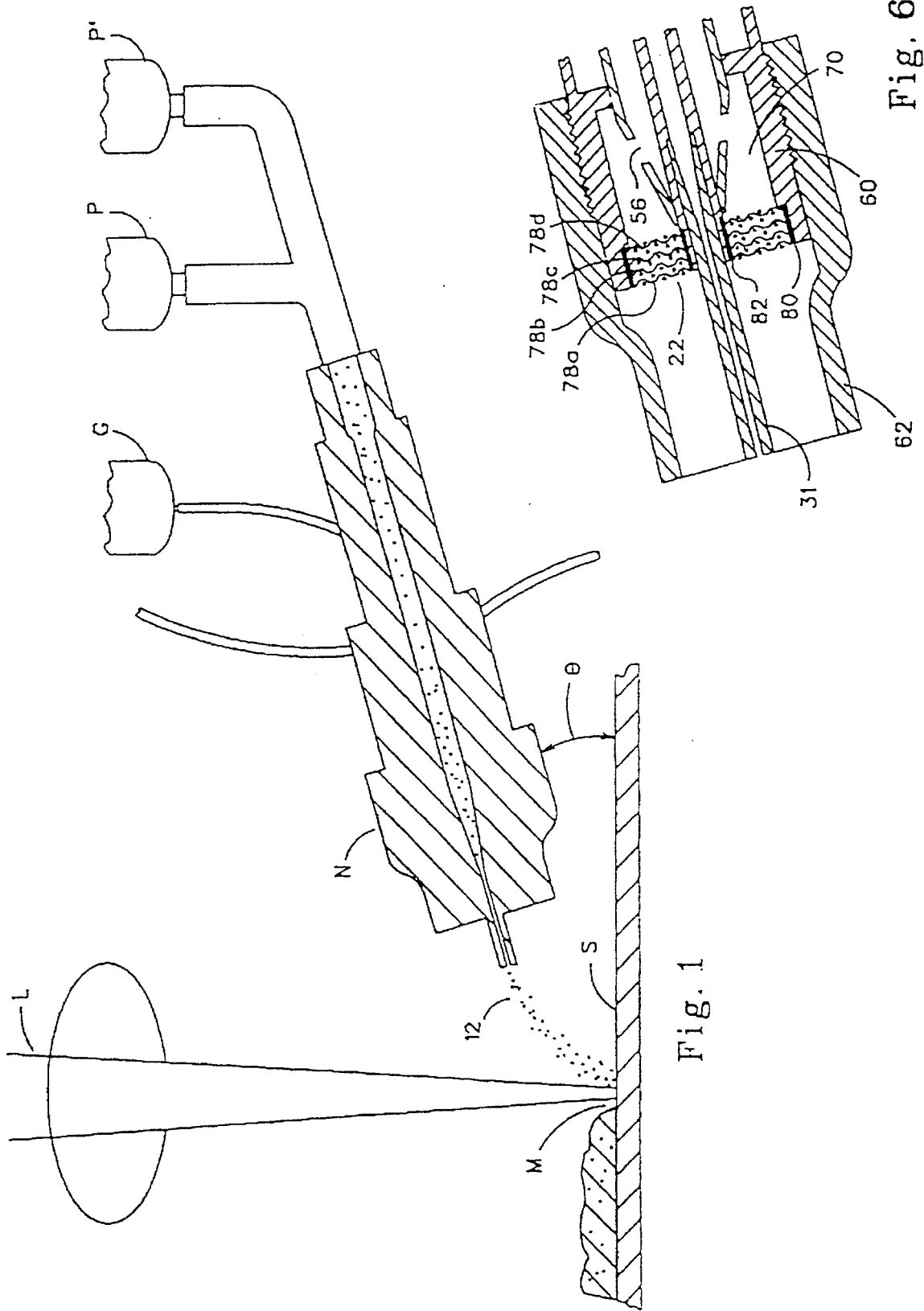

5,477,025

LASER NOZZLE

FIELD OF THE INVENTION

The present invention relates to the delivery of particulate matter onto a substrate. In particular, the present invention is a nozzle for delivering particulate matter into a melt zone created on a substrate by a laser beam or other high energy power source.

BACKGROUND OF THE INVENTION

In general, the surface of a metallic article may be alloyed by the simultaneous and cooperative operation of a laser beam and an alloy powder. To accomplish this, systems have been proposed incorporating a laser source and focusing apparatus, with a powder delivery apparatus provided as part of an integral package. The laser beam melts a relatively small area at the surface of the article, and a controlled volume of alloying particles are delivered into the melt pool.

As an example, gas turbine engines, such as utilized with jet aircraft, are being designed with ever increasing performance requirements. One element of the engine which has been receiving attention is the seal created between the rapidly rotating blades and the surrounding casing. The combustion gases exiting the engine through the rotating blade system should be properly channeled and not be permitted to otherwise escape if efficiencies are to be maximized. It has been the practice to provide the blade tips with abrasive particles which scour the surface of an abradable material mounted in the surrounding casing in order to create a seal which prevents escape of the gases. The blades not only elongate during operation of the engine on account of temperature changes, but also move transverse to their axis of rotation as a result of aircraft operating conditions. Permitting the blade tips to scour the abradable material mounted in the casing allows a very tight dynamic seal to be formed.

Particulates have been applied to blade tips by various means, generally involving some sort of electrodeposition or sintering process. Neither of these processes, however, creates a fusion bond between the particulate and the blade tip. The particulates may become loosened from the tip during operation of the engine, with the result that engine efficiency may diminish over time.

The present invention is directed to a nozzle for applying particulates to a turbine engine blade tip through the use of a particulate delivery nozzle in conjunction with a laser beam. The nozzle causes the supplied particulates to exit coaxially with a selected shield gas, and an internal diffusion system assures that the shield gas is not channelized when exiting the nozzle.

SUMMARY OF THE INVENTION

Generally, this invention fulfills the above-described needs in the art by providing a nozzle comprising a core having an inlet and an outlet and an aperture extending therebetween, a body secured to and surrounding the core and therewith providing an annulus, the body having a gas inlet and a gas outlet intermediate the core inlet and outlet, a bushing assembly secured to and surrounding the body and terminating short of the core outlet and defining a cavity into which the gas outlet issues, a diffuser system disposed between the bushing assembly and the core for causing gas issuing from the gas outlet to be uniformly distributed about and operatively communicated relative to and beyond the core outlet. In preferred embodiments of the invention, the diffuser system is comprised of four axially spaced screens.

A system for delivering a powder into a melt zone of a substrate comprises a nozzle for delivering a powder to a desired situs. The nozzle comprises a delivery core having an inlet and an outlet. A body is secured to the core and therewith defines an annulus, and the body has gas inlet and outlet passages. The gas outlet passages are intermediate the core outlet and core inlet. A cooling system surrounds the body for cooling same. A bushing assembly is secured to the body and terminates short of the gas outlet and defines a cavity into which the outlet passages issue. A diffuser is secured between the bushing and the core for causing gas issuing from the gas outlet to be uniformly distributed about and operatively communicated relative to and beyond the core outlet. Means are provided for supplying powder to the core inlet, and means provide a shield gas to the gas inlet.

These and other features and advantages of the invention will be readily apparent in view of the following drawings and description of the above-described invention.

BRIEF DESCRIPTION OF THE DRAWINGS

The above and other advantages and novel features of the present invention will become apparent from the following detailed description of the preferred embodiment of the invention illustrated in the accompanying drawings, wherein:

FIG. 1 is a fragmentary elevational view partially in section of a system embodying the laser nozzle of the invention.

FIG. 6 is a fragmentary cross-sectional view of the downstream end of the nozzle of the present invention.

DESCRIPTION OF THE INVENTION

A coating system utilizing the nozzle N of the present invention is best shown in FIG. 1. The coating system includes laser beam L provided by a laser source and which creates a puddle or melt zone M on the targeted surface of substrate S. As best shown in FIG. 1, the coating system also includes hoppers P and P' for delivering particulates to nozzle N, and gas supply G for delivering shield gas to nozzle N. While nozzle N has been developed for applying particulates to turbine blades, nozzle N may be utilized for applying a powderized coating to any substrate. Furthermore, those skilled in the art will appreciate that nozzle N may be employed where melt zone M is created by high energy sources other than laser beam L, provided that the energy output is localized and that only a relatively small puddle M of molten substrate is formed.

Figure 2:
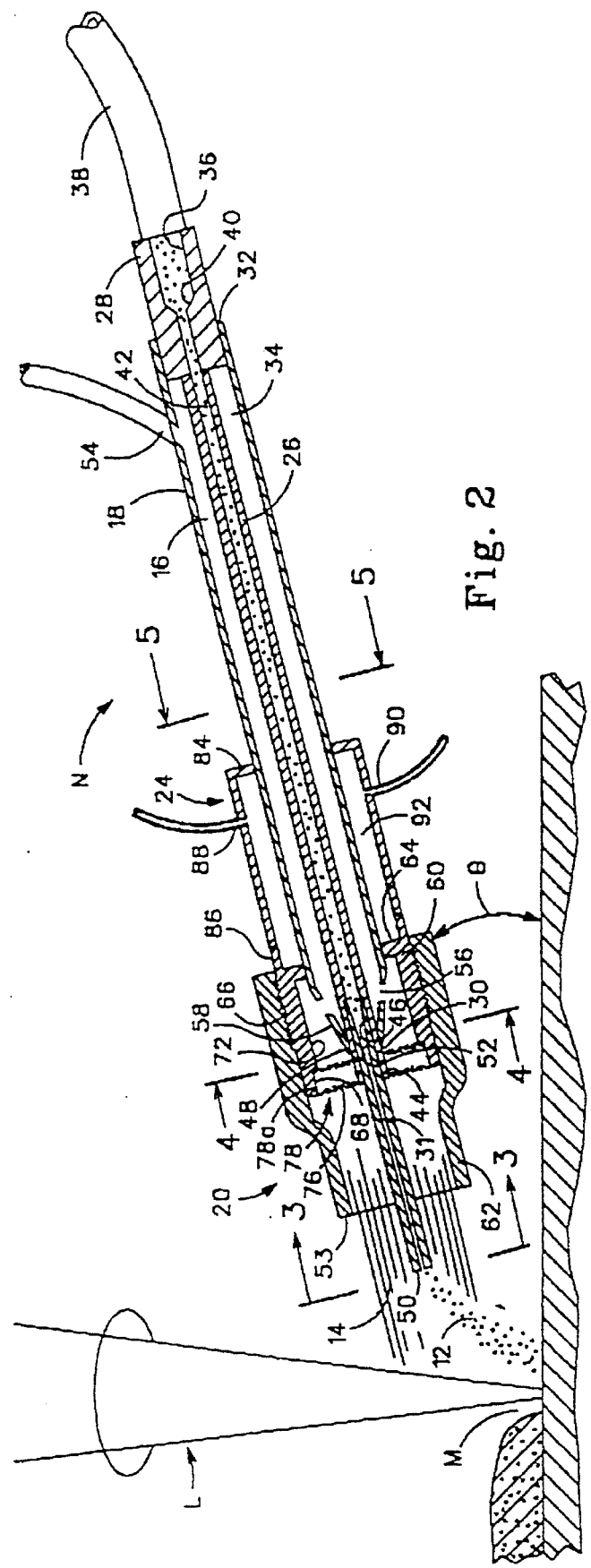
FIG. 2 is a fragmentary cross-sectional view of the nozzle system of the invention.

Nozzle N, as best shown in FIG. 2, delivers particulates 12 into puddle M. Nozzle N also delivers shield gas 14, preferably an inert gas such as argon or helium, about puddle M to prevent adverse oxidation of substrate S upon resolidification of puddle M after dispersion of particulates 12 into the melt pool. As appreciated by those skilled in the art, substrate S has a mass substantially greater than the mass of puddle M, so that substrate S acts as a heat sink for rapidly cooling puddle M when the substrates and pool M are moved relative to beam L.

Figure 5:
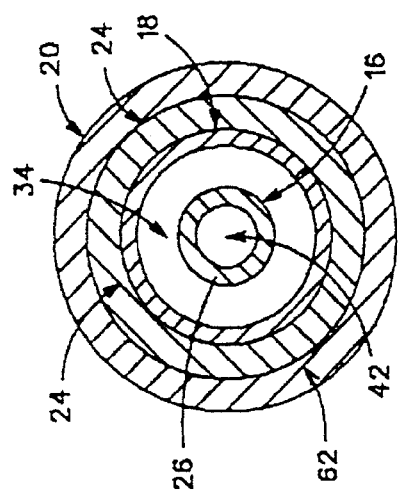
FIG. 5 is a cross-sectional view of the nozzle of the present invention taken along the line 5—5 of FIG. 1 and viewed in the direction of the arrows.
Figure 4:
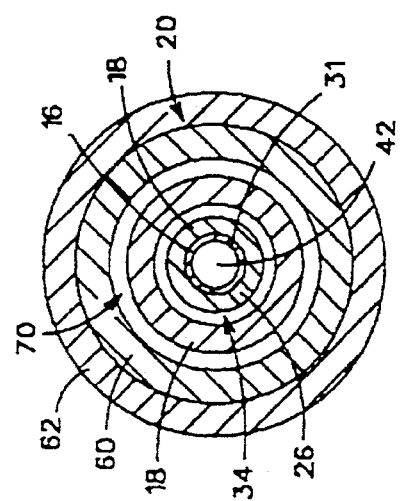
FIG. 4 is a cross-sectional view of the nozzle of the present invention taken along the line 4—4 of FIG. 1 and viewed in the direction of the arrows.
Figure 3:
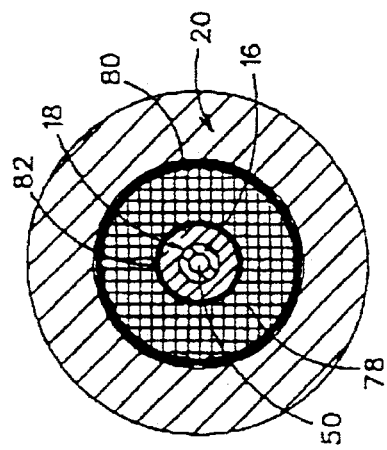
FIG. 3 is a cross-sectional view of the nozzle of the present invention taken along the line 3—3 of FIG. 1 and viewed in the direction of the arrows.

Referring again to FIG. 2, nozzle N includes core 16 for delivering particulate 12, housing 18 for delivering shield gas 14, and support assembly 20 for supporting diffuser 22 and for conditioning and directing the flow of shield gas 14. Nozzle N also includes cooling jacket 24 for cooling nozzle N. As best shown in FIGS. 3, 4 and 5, core 16, housing 18, support assembly 20, and cooling jacket 24 are hollow generally cylindrical tubular elements arranged about a common axis. The elements of nozzle N, including core 16, housing 18, support assembly 20, and cooling jacket 24, are preferably manufactured from copper because copper is reflective to the energy of a $CO_2$ laser. Diffuser 22 is preferably made from stainless steel wire mesh.

Core 16, as best shown in FIG. 2, consists of four sections including tube 26, bulb 28, interface 30, and insert 31. Bulb 28 is located at the upstream end of core 16. Preferably, tube 26, bulb 28, and interface 30 are integral. The outer diameter of bulb 28 is larger than the outer diameter of tube 26 so that gas seal 32 may be effected while annular conduit 34 is provided about core 16. Bulb 28 has bore 36 for connecting nozzle N to a supply of particulates from hoppers P and P' as best shown in FIG. 1 Bore 36 extends into bulb 28 a sufficient distance to securely hold tube 38, and includes lead-in 40 which provides a transition to bore 42.

Interface 30 is located at the downstream end of tube 26. Interface 30 is characterized by shoulder 44 and counterbore 46. Shoulder 44 is one of two surfaces with which diffuser 22 makes sliding contact securement, as will be discussed in more detail below. Insert 31 is in friction engagement with counterbore 46. Interface 30 is also the area where second gas tight seal 48 is made with housing 18. Seal 48 is made just upstream from shoulder 44.

Insert 31 is a replaceable element which is engaged with counterbore 46. Insert 31 is provided with through-hole 50 in communication with bore 42. Insert 31 is also provided with lead-in 52 creating a smooth transition between bore 42 and through-hole 50 for particulate 12. Lead-in 52 has an included angle of 14°. The diameter of through-hole 50 is determined, in part, by the size of the deposit of particulates 12 to be laid down on substrate S. Insert 31 has a length sufficient to position downstream end 53 of support assembly 20 out of contact with laser beam L, as shown in FIG. 2. Because insert 31 extends coaxially beyond assembly 20, then nozzle N may be pivoted relative to beam L without beam L irradiating the assembly 20 by impingement thereon. Insert 31 is replaceable because through-hole 50 may become clogged, insert 31 may be hit with molten material from puddle M, and different diameter through-holes 50 are desired for applying different sizes of deposits.

Housing 18 has conduit 34 disposed about core 16 for delivering shield gas 14 to puddle M. Housing 18 has frustroconical end 58 at the downstream end thereof for transitioning from its full diameter to the reduced diameter of seal 48. Housing 18 is also provided with gas inlet 54 and gas outlets 56. Gas outlets 56 are several, preferably four (4) or five (5), and extend radially through end 58 in uniform angularly spaced relation. Gas outlets 56 cause shield gas 14 to issue from housing 18 substantially transverse to the axis of nozzle N.

Support assembly 20 includes support bushing 60 and cup 62 for conditioning the flow of shield gas 14. Support bushing 60 has tab 64 at the upstream end for securing support bushing 60 to nozzle N. Tab 64, as best shown is FIG. 2, extends inward of support bushing 60 and contacts the outside of housing 18 and is secured thereto just upstream of gas outlets 56 and cone 58. Support bushing 60 is also provided with an external screw thread 66, for securing cup 62 to nozzle N, and with step 68. Step 68 is the second of two surfaces with which diffuser 22 makes sliding contact securement. The arrangement of support assembly 20 about core 16 and housing 18 provides cavity 70 formed between cone 58, support bushing 60 and diffuser 22. Shield gas 14 issues from gas outlets 56 into cavity 70 and against wall 72 thereof so that the flow of shield gas 14 is broken up and evenly distributed within cavity 70 prior to exiting through diffuser 22. The area of cavity 70 at the end adjacent diffuser 22 exceeds the area at tab 64, thereby minimizing the velocity of the gas due to reduced pressure on account thereof. Cup 62 provides the final conditioning of shield gas 14 as it issues from nozzle N by directing shield gas 14 beyond insert 31 and toward and about puddle M. Cup 62 is replaceable so that opening 74 thereof may have diameters varying from about ½ inch to about ¾ inch, each of which is utilized depending upon the desired gas flow rate and the size of puddle M. While it is preferred that cup 62 be manufactured from copper, it may also be manufactured from a ceramic material.

Diffuser 22 includes a system of screens 76 for uniformly distributing shield gas 14 about insert 31 and puddle M. Screen system 76 is made up of one or more sheets of wire mesh screen 78. As best shown in FIG. 6, four screens 78a, b, c, and d are preferred. Wire mesh screens 78 are made from stainless steel wire. Screen 78a, closest to substrate S, is a course screen having a mesh size of 120. Screens 78b, c and d are fine screens having a mesh size of 250. As shown in FIGS. 3 and 6, screens 78 are supported by outer ring 80 and inner ring 82 to form an integral unit. Rings 80 and 82 are made from stainless steel, and slidingly engaged surfaces 44 and 68. A diffuser suitable for use in the present invention can be purchased under the part number 54N66 from Ceramic Nozzles, Inc. of Hackensack, N.J.

Cooling jacket 24 surrounds housing 18, with upstream end 84 sealed against housing 18 and downstream end 86 abutting support bushing 60. Cooling jacket 24 has inlet 88 and outlet 90 for a coolant, such as water. The coolant flows about annulus 92 to cool nozzle N.

As shown in FIGS. 1 and 2, nozzle N is disposed at an angle θ to substrate S and is spaced from laser beam L. Nozzle N is laterally spaced from laser beam L and angularly disposed relative thereto, and spaced along substrate S sufficient to permit particulate 12 to be directed into puddle M, depending upon such factors as angle θ, particulate feed rate, and the size of deposit desired. Spacing is also maintained to prevent contact of cup 62 and insert 31 with laser beam L.

Simultaneous with delivery of particulates 12 into puddle M, shield gas 14 is delivered through nozzle N beyond the end of insert 31 and about the zone where laser beam L interacts with substrate S, i.e., puddle M. Particulates 12 do not become entrained in the shield gas 14, because the flow is substantially laminar. Therefore, when positioning nozzle N relative to puddle M, the effect of gravity on particulates 12 must be taken into account, and for this reason and others, insert 31 extends beyond end 53.

The rate of delivery of particulates 12 depends upon the size of the deposit desired and the size of melt zone M.

Particulates 12 may include an abrasive material and a metal matrix material. The abrasive and the metal matrix are fed to nozzle N from feeders P and P' of the type disclosed in U.S. Pat. No. 4,726,715, issued Feb. 23, 1988 to Steen, et al. for SCREW POWDER FEEDERS, the disclosure of which is incorporated herein by reference and the assignee of which is also the assignee hereof. Appropriate regulation of the feeders P and P' permits the rate of abrasive to matrix material to be adjusted.

Laser beam L irradiates a relatively small area of substrate S and forms puddle M of molten substrate material. Particulates 12 are directed into puddle M by insert 31. The delivery of particulates 12 into puddle M operates essentially continuously as substrate S is caused to travel relative to laser beam L and nozzle N. A travel speed of about 10 to 20 inches per minute for substrate S is typical. A total particulate feed rate of about 0.1 grams per second and a shield gas flow rate of about 50 scf per hour into cup 62 are typical.

While this invention has been described as having a preferred design, it is understood that it is capable of further modifications, uses and/or adaptations, following the general principle of the invention and including such departures from the present disclosure as come within known or customary practice in the art to which the invention pertains, and as may be applied to the central features hereinbefore set forth, and fall within the scope of the invention of the limits of the appended claims.

I claim:

1. A nozzle for application of particulate material, comprising:
   a) a core having an inlet for receiving particulates, an outlet for directing the particulates to a selected situs, and an aperture extending therebetween;
   b) a body secured to and surrounding said core and therewith providing an annulus, said body having a gas inlet and a gas outlet intermediate said core inlet and outlet;
   c) a bushing assembly secured to and surrounding said body intermediate said core inlet and outlet, said bushing assembly defining a cavity into which said gas outlet issues; and
   d) a diffuser disposed within said cavity for causing gas issuing from said gas outlet to be uniformly distributed about and operably communicated relative to and beyond said core outlet.

2. The nozzle of claim 1, wherein:
   a) said core outlet includes a removable insert.

3. The nozzle of claim 2, wherein:
   a) said insert is frictionally secured to said core.

4. The nozzle of claim 3, wherein:
   a) said insert is a tube having a tapered inlet for directing particulate smoothly from said aperture into said insert.

5. The nozzle of claim 1, wherein:
   a) said diffuser includes a plurality of axially spaced screens.

6. The nozzle of claim 5, wherein:
   a) said diffuser includes an inner ring and an outer ring creating an integral diffuser.

7. The nozzle of claim 6, wherein:
   a) said diffuser is removable.

8. The nozzle of claim 7, wherein:
   a) said diffuser is in sliding engagement with said bushing assembly and said core.

9. The nozzle of claim 1, wherein:
   a) said diffuser includes at least two axially spaced screens.

10. The nozzle of claim 9, wherein:
    a) the mesh size of said first screen exceeds the mesh size of said second screen.

11. The nozzle of claim 10, wherein:
    a) said first screen is downstream of said second screen.

12. The nozzle of claim 8, wherein:
    a) said diffuser includes four axially spaced screens.

13. The nozzle of claim 12, wherein:
    a) the mesh size of said first screen exceeds the mesh size of said second, third and fourth screens.

14. The nozzle of claim 13, wherein:
    a) said first screen is downstream of said second, third and fourth screens.

15. The nozzle of claim 1, wherein:
    a) said body has a frustoconical portion extending beyond said gas outlet.

16. The nozzle of claim 15, wherein:
    a) said cavity has a variable area which area increases from the downstream toward the upstream end for minimizing the gas velocity due to reduced pressure.

17. The nozzle of claim 15, wherein:
    a) said gas outlet extends radially from said body.

18. The nozzle of claim 17, wherein:
    a) said gas outlet includes a plurality of equiangularly spaced apertures.

19. The nozzle of claim 1, further comprising:
    a) a cooling system operably associated with said body.

20. The nozzle of claim 19, wherein:
    a) said core, said body, said bushing assembly, said diffuser and said cooling system are coaxial.

21. The nozzle of claim 1, wherein:
    a) said bushing assembly includes a support and a cup.

22. The nozzle of claim 21, wherein:
    a) said support is secured to and surrounds said body; and
    b) said cup is secured to and surrounds said support.

23. The nozzle of claim 22, wherein:
    a) said support includes an external screw thread for securing said cup thereto.

24. A system for delivering a powder into a melt zone of a substrate, comprising:
    a) a nozzle for delivering a powder to a desired situs, said nozzle comprising a delivery core having an inlet and an outlet, a body secured to said core and therewith defining an annulus, said body having gas inlet and outlet passages and wherein said gas outlet passages are intermediate said core inlet and outlet, a cooling system surrounding said body for cooling same, a bushing assembly secured to said body and intermediate said core inlet and outlet, said bushing assembly defining a cavity into which said outlet passages issue, and a diffuser secured between said bushing assembly and said core for causing gas issuing from said gas outlet passages to be uniformly distributed about and operatively communicated relative to and beyond said core outlet;
    b) means for supplying powder to said core inlet; and
    c) means for providing a shield gas to said gas inlet.

25. The system of claim 24, wherein:
    a) said bushing assembly includes a removable cup.

26. The system of claim 24, further comprising:
    a) a high intensity energy source for causing a relatively small area of the substrate to become molten.

27. The system of claim 26, wherein:

a) said high intensity energy source is a laser.

28. The system of claim 27, wherein:

a) said nozzle is operatively disposed at an angle to the substrate and said laser.

29. The system of claim 28, wherein:

a) said core outlet includes a removable insert extending beyond said bushing assembly and frictionally secured to said core.

30. The system of claim 29, wherein:

a) said insert extends beyond said bushing assembly to prevent irradiation of said bushing assembly by said energy source.

31. The system of claim 24, wherein:

a) said diffuser includes a plurality of axially spaced screens.

32. The system of claim 31, wherein:

a) the first of said plurality of screens is downstream of the other of said plurality of screens; and b) the mesh size of the first of said plurality of screens exceeds the mesh size of the other of said plurality of screens.

33. The system of claim 32, wherein:

a) said diffuser includes four axially spaced screens.

34. The nozzle of claim 1, wherein said nozzle is for laser application of particulate matter in that said core outlet directs the particulate to the situs which is a melt zone of a substrate, the laser being separate from said nozzle and forming the melt zone by focusing a laser beam on the substrate.

* * * * *